United States Patent
Ouyang et al.

(10) Patent No.: US 10,728,773 B2
(45) Date of Patent: Jul. 28, 2020

(54) AUTOMATED INTELLIGENT SELF-ORGANIZING NETWORK FOR OPTIMIZING NETWORK PERFORMANCE

(71) Applicant: Verizon Patent and Licensing Inc., Arlington, VA (US)

(72) Inventors: Ye Ouyang, Piscataway, NJ (US); Le Su, Edison, NJ (US); Krishna Pichumani Iyer, Basking Ridge, NJ (US); Christopher M. Schmidt, Branchburg, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/880,848

(22) Filed: Jan. 26, 2018

(65) Prior Publication Data

US 2019/0239095 A1    Aug. 1, 2019

(51) Int. Cl.
*H04W 24/02*    (2009.01)
*H04W 24/08*    (2009.01)
*G06N 3/08*    (2006.01)
*G06N 3/04*    (2006.01)
*H04W 84/18*    (2009.01)

(52) U.S. Cl.
CPC ........... *H04W 24/02* (2013.01); *G06N 3/04* (2013.01); *G06N 3/08* (2013.01); *H04W 24/08* (2013.01); *H04W 84/18* (2013.01)

(58) Field of Classification Search
CPC ..... H04W 24/02; H04W 24/08; H04W 84/18; G06N 3/04; G06N 3/08; G06N 3/084; G06N 3/0454
See application file for complete search history.

(56) References Cited

U.S. PATENT DOCUMENTS

| | | | |
|---|---|---|---|
| 2016/0205697 A1* | 7/2016 | Tan ................. | H04W 24/02 370/329 |
| 2017/0019193 A1* | 1/2017 | Pratt ................. | H04B 17/27 |
| 2019/0014488 A1* | 1/2019 | Tan ................. | G06N 3/08 |

* cited by examiner

*Primary Examiner* — Marcos L Torres

(57) ABSTRACT

A Self-Organizing Network (SON) collects data pertaining to a first number of cells of a wireless network. The SON splits the collected data into a second number of groups, and, for each of the second number of groups, repeatedly set a third number of clusters to a different number between a low limit and a high limit. The SON, for each of the settings, clusters the cells into the third number of clusters and trains a deep neural network to perform a regression analysis on the third number of clusters. For each of the second number of groups, the SON also determines an optimum number of clusters based on the regression analyses, re-clusters the cells into the optimum number of clusters; and tunes engineering parameters based on the re-clustering to optimize performance of the wireless network and quality of experience pertaining to the wireless network.

20 Claims, 16 Drawing Sheets

```
1       // SPLIT DATA SET TO S GROUPS OF DATA
2       FOR U=0:S
3           FOR k=K_N:K_X  DO
4               // CLUSTERING
5               R1 = K-MENAS (k, APPLICATION FEATURES)
6               R2 = FCM (k, APPLICATION FEATURES)
7               R3 = GMM (k, APPLICATION FEATURES)
8               R4 = H-CLUST(k, APPLICATION FEATURES)
9               R5 = ENSEMBLE CLUSTERING(R1, R2, R3, R4, R5)
                // DNN BASED REGRESSION
10              A_k = 0
11              FOR h = 1:k
12                  Y = F(X);
13                  SS_{E,h} (Y, Ŷ)
14                  SS_{T,h} (Y, Ŷ)
15                  R = 1 -  SS_{E,H} (Y, Ŷ) / SS_{T,h} (Y, Ŷ)
16                  A_k = R W + A_k
17              END FOR
18          END FOR
19          K_O = k WHEN A_k IS MAXIMUM

20          FOR c = 1:C DO
21              Lt,c = ENSEMBLE CLUSTERING(RK_T)
22          END FOR

// SIMILARITY BASED PARAMETER TUNING
23          MIN_VALUE = ∞
24          V = 1
25          FOR I=1:K_T DO
26              FOR J=1: NUMBER OF POINTS IN ITH CLUSTER DO
27                  IF (I_TARGET = I_J)
28                      DIF = MIN(MIN_VALUE, 1 - SIMILARITY)
29                      IF (DIF < MIN_VALUE)
30                          MIN_VALUE = DIF
31                          V = J
32                  END FOR
33              END FOR
34              P_{I,1}, P_{I,2} ... P_{I,R}
35          END FOR
```

FIG. 7

| TRAFFIC TYPE | CELL 1 | CELL 2 | CELL N |
|---|---|---|---|
| INSTANT MESSAGING | 0.035 | .0054 | .05517 |
| READING | 0.0376 | .00075 | .00179 |
| SOCIAL MEDIA | .0039 | .0026 | .00068 |
| NAVIGATION | .0002 | .00018 | .000157 |
| VIDEO | .2214 | .1526 | .187 |
| MUSIC | .00023 | .0095 | .161 |
| APPLICATION STORE | .058 | .000144 | .00061 |
| GAME | .000067 | .0000095 | .000154 |
| ONLINE PAYMENT | .000065 | .00104 | .000406 |
| ANIME | .000015 | .00104 | .000191 |
| EMAIL | .000002 | .000104 | .000011 |
| P2P APPLICATION | .00023 | .000017 | .000195 |
| VOIP APPLICATION | .0018 | .0020 | .0015 |
| MULTI-MEDIA MESSAGING | .0033 | .000012 | .0035 |
| BROWSING AND DOWNLOADING | .1654 | .2128 | .18 |
| FINANCE | .00002 | .0010 | .0000435 |
| ANTI-VIRUS | .000128 | .00000897 | .0000957 |
| OTHER APPLICATION | .127 | .005094 | .001837 |
| UNIDENTIFIABLE APPLICATIONS | .347 | .6084 | .409910 |

FIG. 8

FIG. 9
| Cell No. | M-A | M-B | M-C |
|---|---|---|---|
| 1 | 1 | 1 | 4 |
| 2 | 1 | 1 | 4 |
| 3 | 1 | 2 | 3 |
| 4 | 2 | 2 | 3 |
| 5 | 2 | 3 | 3 |
| 6 | 3 | 1 | 2 |
| 7 | 3 | 2 | 2 |
| 8 | 4 | 3 | 1 |
| 9 | 4 | 4 | 1 |
RELABEL
RELABEL
| Cell No. | M-A | M-B | M-C | Final vote |
|---|---|---|---|---|
| 1 | 1 | 3 | 1 | 1 |
| 2 | 1 | 3 | 1 | 1 |
| 3 | 1 | 1 | 2 | 1 |
| 4 | 2 | 1 | 2 | 2 |
| 5 | 2 | 2 | 2 | 2 |
| 6 | 3 | 3 | 3 | 3 |
| 7 | 3 | 1 | 3 | 3 |
| 8 | 4 | 2 | 4 | 4 |
| 9 | 4 | 4 | 4 | 4 |
FIG. 10A
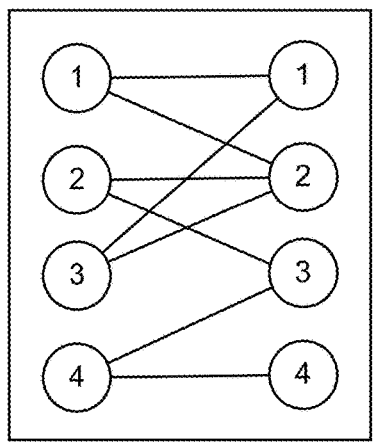
FIG. 10B
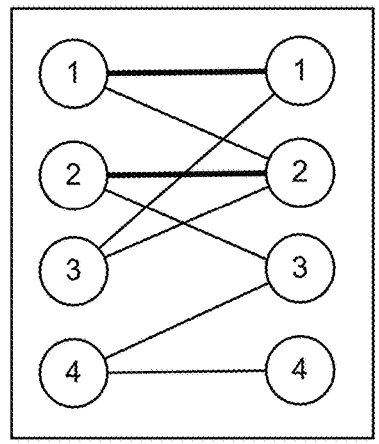
FIG. 10C
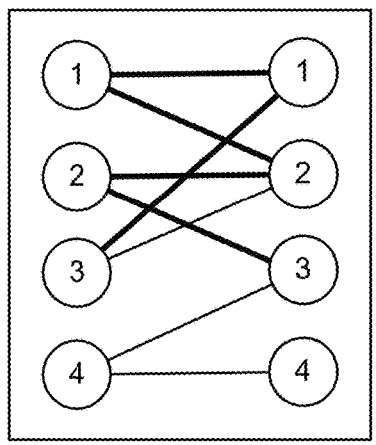
FIG. 10D
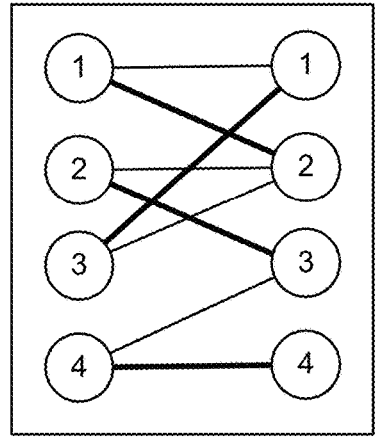

1300

| TYPE | DATA CONTENT |
|---|---|
| CELL ATTRIBUTE | CELL ID<br>REGION<br>TYPE OF LOCATION (URBAN/RURAL)<br>NUMBER OF USERS<br>NUMBER OF DEVICES |
| DATE/TIME | DATE<br>TIME |
| ENGINEERING PARAMETERS | AZIMUTH ANGLE<br>PITCH ANGLE<br>HEIGHT<br>LONGITUDE<br>LATITUDE<br>REFERENCE SIGNAL POWER<br>M-DOWNTILT<br>E-DOWNTILT<br>OTHERS (30 PARAMETERS) |
| NETWORK PERFORMANCE INDICATOR (APPLICATION RELATED) | TCP CONNECTION SUCCESS RATE<br>HTTP CONNECTION SUCCESS RATE<br>VIDEO CONNECTION REQUEST SUCCESS RATE<br>APP. DOWNLOAD REQUEST SUCCESS RATE<br>INSTANT MESSAGING REQEUST SUCCESS RATE<br>TCP ESTABLISHMENT LATENCY<br>HTTP SESSION LATENCY<br>WEB PAGE DISPLAY LATENCY |
| NETWORK PERFORMANCE INDICATOR (GENERAL) | NETWORK CONNECTION RATE<br>DROPPED CALL RATE<br>RRC CONNECTION RATE<br>ERAB CONNECTION RATE |

FIG. 13

AUTOMATED INTELLIGENT SELF-ORGANIZING NETWORK FOR OPTIMIZING NETWORK PERFORMANCE

BACKGROUND INFORMATION

A self-organizing network (SON) employs automation technology to facilitate planning, deployment, operation, optimization, and repair of mobile radio access networks. To date, many self-organizing networks apply rudimentary controls to adjust network parameters. As complexity of networks and the insatiable demand for mobile broadband continue to increase, the need for an automated intelligent SON has never been greater.

BRIEF DESCRIPTION OF THE DRAWINGS

FIG. 7 describes logic of the flow diagram of FIG. 6;

FIG. 8 illustrates different types of network traffic information as input to the APP-SON system of FIG. 4, pertaining to one or more cells in the network environment of FIG. 2;

FIG. 9 illustrates an exemplary cluster and an exemplary result of re-labeling the cluster in accordance with the Hungarian Algorithm Assisted Clustering (HAAC);

FIGS. 10A-10D illustrate applying the Hungarian Algorithm Assisted Clustering method to clusters;

FIG. 13 illustrates exemplary key performance indicators and data collected and used by the APP-SON system of FIG. 4;

DETAILED DESCRIPTION OF PREFERRED EMBODIMENTS

The following detailed description refers to the accompanying drawings. The same reference numbers in different drawings may identify the same or similar elements.

Figure 1:
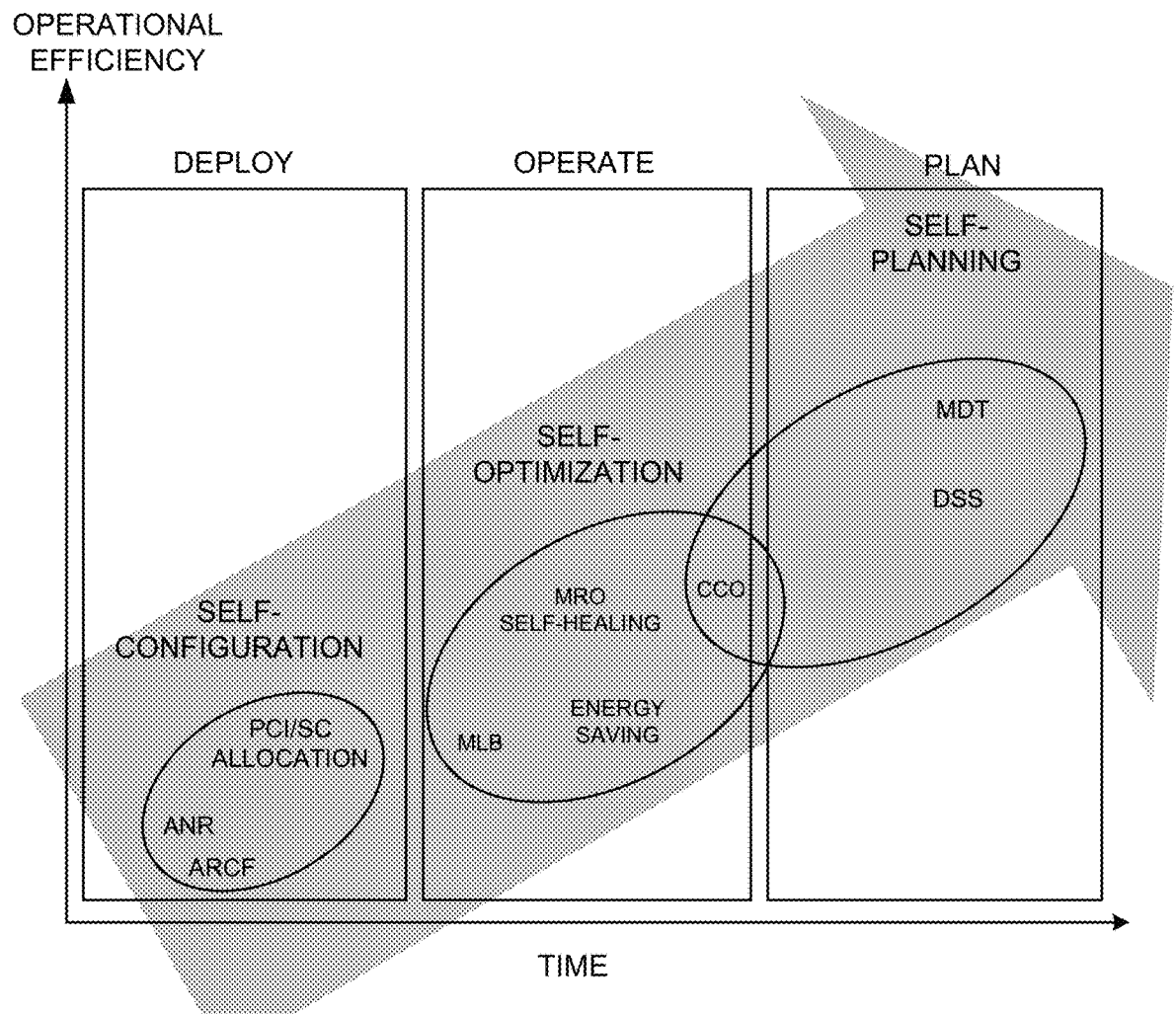
FIG. 1 illustrates evolution of self-organizing networks (SONS)

A self-organizing network (SON) is designed to make the planning, deployment, operation, optimization, and healing of mobile radio access networks simpler and faster. Functionally, a SON can be implemented to provide for self-configuration in the deployment phase of the network engineering life cycle, self-optimization in the operations phase; and self-repair in the planning phase. Different roles that a SON can take during these different phases of network lifecycle are illustrated in FIG. 1. Self-configuration strives toward a "plug-and-play" paradigm such that new base stations are automatically configured and integrated into a network as needed. Self-optimization aims to change network behavior by altering configuration parameters based on observations of both the base stations and measurements at user equipment (UE) (e.g., mobile devices or handsets coupled thereto). For self-healing, when some nodes in the network become inoperative, the SON aims to reduce the impacts from the failure and restore operations.

For SONs, the trend in network operations is to gradually move from semi-manual toward autonomous intelligent planning, deployment, and optimization. Semi-manual operation means that SON functionalities suggest configurations which need to be first approved by a human operator before they are implemented. Autonomous network operation means that approval by the human operator is skipped. During the planning phase, the Centralized Overage and Capacity Optimization (CCO) and decision support system (DSS) functions are implemented to reduce the operator's efforts. In the deployment phase, the self-configuration functions enable the network to install new nodes in the plug-and-play fashion. The operator's effort in configuring and optimizing intranet and neighboring networks is reduced by the Automatic Neighbor Relations (ANR) and the effort in Physical Cell ID (PCI) allocation is avoided. In the operation phase, the distributed SON functions (e.g., mobility robustness optimization (MRO), mobility load balancing (MLB), minimized drive test (MDT) and Energy Savings functions) enable the operator to obtain cell-specific and dynamic configurations, in contrast to base station-based configurations in the planning phase.

Although SONs have been evolving, most of the SON solutions are based upon hardcoded and hand-crafted rules, which are automated through engineering processes. Also, there has not been any solutions to optimize user Quality of Experience through SON. The application characteristics-driven (APP)-SON systems described herein are designed to improve performance and user Quality of Experience through performance optimization (e.g., fewer dropped calls, increased signal strength at base stations, increased transmission control protocol (TCP) connection success rate, increased hyper-text transfer protocol (HTTP) connection success rate, web page display latency, improved connection latency, etc.).

The APP-SON solution, as described herein, addresses many issues that are left open by other SON systems. For example, the solution may identify key performance indicators (KPIs) be prioritized for each cell, as well as determine how the KPIs to relate to network optimization. The APP-SON solution may also obtain images of network traffic characteristics and traffic patterns for each cell, as well as cell profiles to find the corresponding and targeted performance indicators of high priorities. The APP-SON solution may further indicate how engineering parameters need to be tuned (e.g., the values of the parameters are modified), to optimize wireless KPIs and improve user Quality of Experience. This particularized approach for based on KPI is in contrast with the legacy SON solutions, which normally apply a global solution template, for example, to all cell towers rather than identifying the individual application and traffic characteristics for each cell. Such a general solution may not be the optimal solution to the cells with different traffic patterns and application characteristics.

As described in detail below, an APP-SON implementation consistent with aspects described herein is scalable and customizable. It also may operate and optimize network and user Quality of Experience at regular intervals of granularity, such as hourly, daily, minute by minute or the like. Furthermore, the APP-SON can handle dynamic network scenarios that vary from hour to hour. Because the APP-SON is based on data collected at application level, as well as lower network level data, network cells can be optimized for both user Quality of Experience and network performance. In contrast, in some SONS that do not rely on application level data, although network performance may appear good, users may complain about poor experience.

Figure 2:
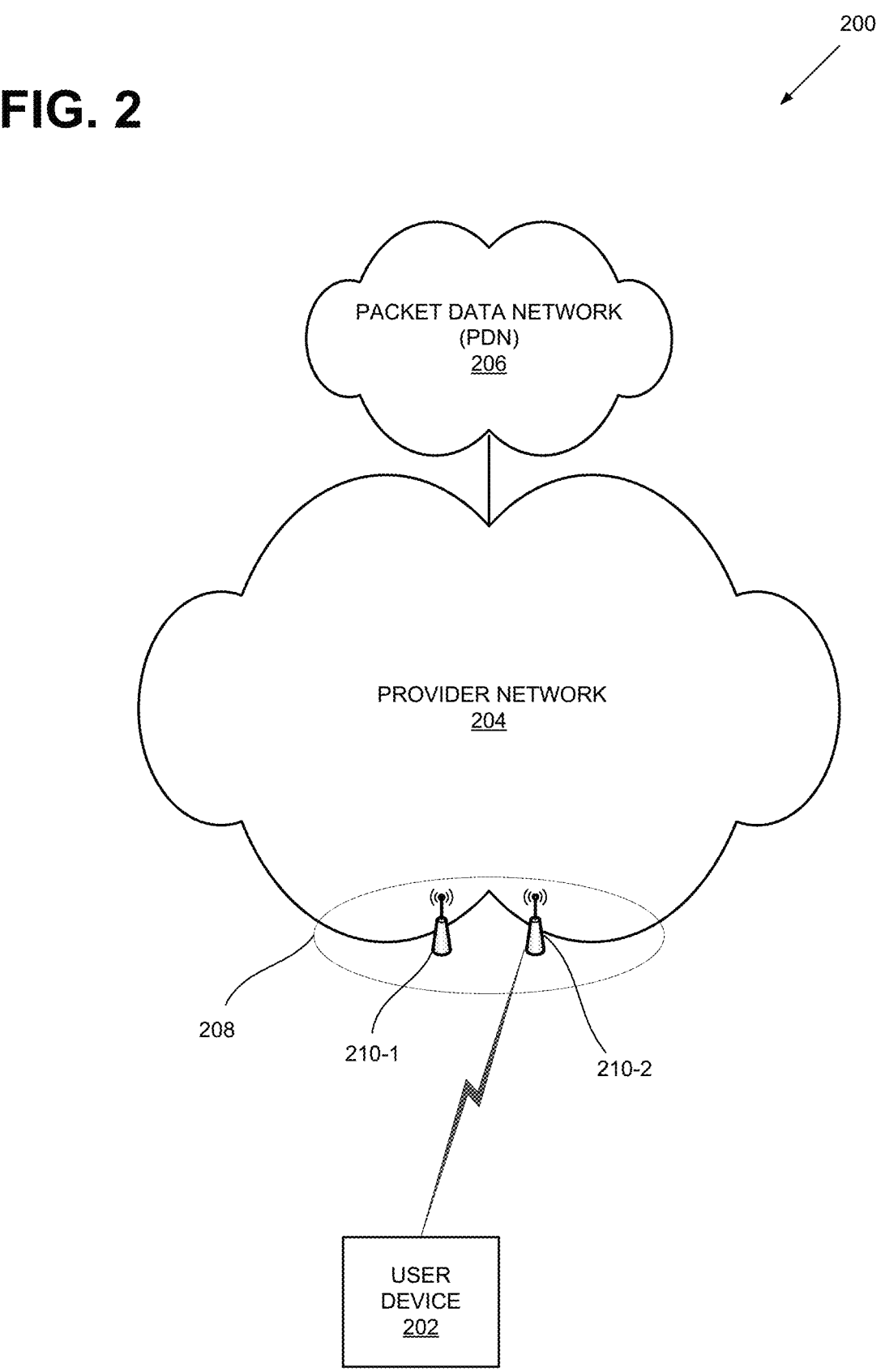
FIG. 2 depicts an exemplary network environment in which application characteristics driven (APP)-SON systems and methods described herein may be implemented.

FIG. 2 illustrates an exemplary network environment 200 in which the APP-SON system described herein may be implemented. As shown, environment 200 may include a user device 202, a provider network 204 and a packet data network (PDN) 206. Although environment 200 may include other devices and components, for simplicity, they are not illustrated. For example, environment 200 may include millions of user devices, routers, switches, computers (e.g., servers, personal computers, etc.).

User device 202 may include an electronic device having communication capabilities. For example, user device 202 may include a smart phone, a wearable computer (e.g., a wrist watch, eye glasses, etc.), a tablet, a set-top box (STB), any type of internet protocol (IP) communications device, a voice over internet protocol (VoIP) device, a laptop computer, a palmtop computer, a gaming device, a media player device, a digital camera that includes communication capabilities (e.g., wireless communication mechanisms), or Internet-of-Things (IoTs). In a long-term evolution (LTE) environment, user device 202 may be referred to as user equipment (UE).

Provider network 204 may include one or more wireless and wireline networks of any type, such as, for example, a local area network (LAN), wide area network (WAN), wireless local area network (WLAN), wireless satellite network, and/or one or more wireless public land mobile networks (PLMNs). The PLMN(s) may include a Code Division Multiple Access (CDMA) 2000 PLMN, Global System for Mobile Communications (GSM) PLMN, Long Term Evolution (LTE) PLMN and/or other types of PLMNs not specifically described herein.

Packet data network (PDN) 206 may include a network that supports Internet Protocol (IP)-based communications. PDN 206 may include, for example, an IP Multimedia Subsystem (IMS) network, which may provide voice and multimedia services to user device 202 based on Session Initiation Protocol (SIP).

Depending on the implementation, provider network 204 may include an LTE network that includes an evolved UMTS Terrestrial Network (eUTRAN) 208. eUTRAN 208 may include one or more eNodeBs 210-1 and 210-2 (herein collectively referred to as "eNodeB 210"). eNodeB 210 may include one or more devices and components that allow user device 202 to wirelessly connect to provider network 204. Although referred to herein as eNodeBs 210, in other network environments, features and functionality associated with eNodeBs 210 may be implemented or performed by similar base station devices. Each of such devices may transmit to or receive signals from a specified area, herein referred to as a "cell."

In FIG. 2, provider network 204 (or part of provider network 204) may be implemented as an APP-SON (or APP-SON system). The APP-SON may collect data from network nodes (e.g., eNodeB 210) and/or other network devices and components. Once the data is collected, computing devices (e.g., computers, neural network hardware, etc.) in provider network 204 may aggregate the data, re-group the data, cluster the data, perform regression analysis, relabel the clusters, and perform parameter tuning (e.g., making changes to the values of the parameters). These devices may host web servers, application servers, and/or other systems for availing data through network user interfaces (e.g., web browser) to operators. The APP-SON may also allow the operators (e.g., via web browsers) and/or other components (e.g., a computer that determines an optimal engineering parameter) to control and/or set the engineering parameters (e.g., power level at an antenna of eNodeB 210).

In network environment 200, the APP-SON may be implemented in accordance with a centralized architecture, distributed architecture, and a hybrid architecture (a combination of the centralized and distributed architecture). In the centralized SON architecture, APP-SON optimizations are performed at the network management level. Commands, requests, and parameter settings flow from the network management level to network elements, while measurement data and reports flow in the opposite direction. In the distributed SON architecture, APP-SON optimizations are performed at network nodes and the nodes exchange SON related messages directly with each other. In the hybrid SON architecture, a portion of the APP-SON optimization process run at the network management level and the remaining portions run on the network elements. In some embodiments, the hybrid SON architecture combines parts of centralized and distributed SON solutions, with the centralized coordination of SON functions and the ability to respond quickly to changes at the network element level.

Figure 3:
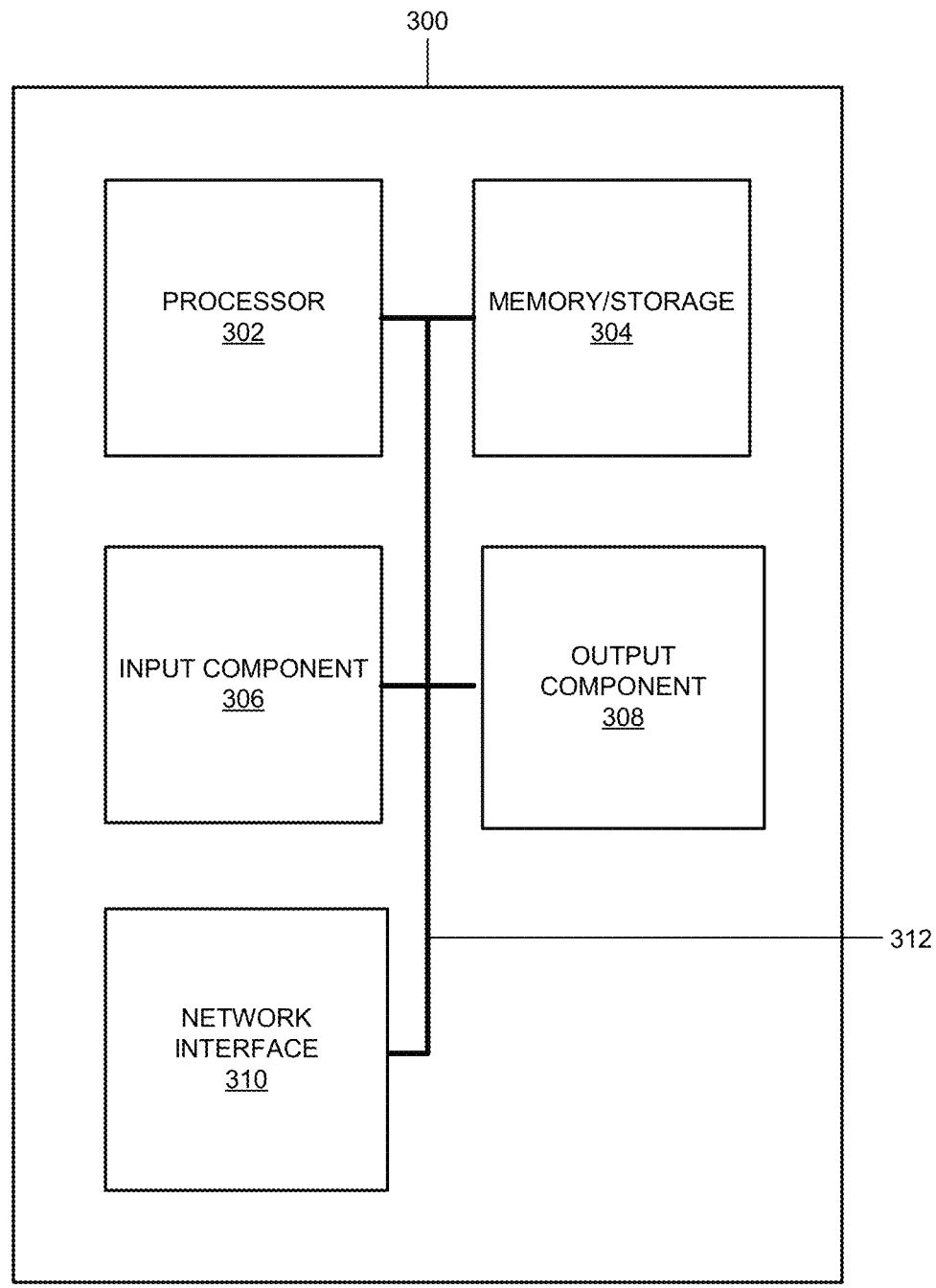
FIG. 3 illustrates exemplary components of network devices included in the network environment of FIG. 2.

FIG. 3 is a block diagram of exemplary components of a network device 300. Network device 300 may correspond to or be included in the devices and/or components of the networks depicted in FIG. 2 (e.g., user device 202, a router, a switch, a server, etc.). In some embodiments, an APP-SON may be implemented on one or more of network devices 300.

As shown, network device 300 may include a processor 302, memory/storage 304, input component 306, output component 308, network interface 310, and communication path 312. In different implementations, network device 300 may include additional, fewer, different, or different arrangement of components than the ones illustrated in FIG. 3. For example, network device 300 may include line cards, modems, etc.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions.

Memory/storage 304 may include static memory, such as read only memory (ROM), and/or dynamic memory, such as random access memory (RAM), or onboard cache, for storing data and machine-readable instructions (e.g., programs, scripts, etc.).

Memory/storage 304 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 304 may be external to and/or removable from network device 300. Memory/storage 304 may include, for example, a Universal Serial Bus (USB) memory stick, a dongle, a hard disk, off-line storage, a Blu-Ray® disk (BD), etc. Memory/storage 304 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 306 and output component 308 may provide input and output from/to a user to/from device 300. Input/output components 306 and 308 may include a display screen, a keyboard, a mouse, a speaker, a microphone, a camera, a DVD reader, USB lines, and/or other types of components for obtaining, from physical events or phenomena, to and/or from signals that pertain to device 300.

Network interface 310 may include a transceiver (e.g., a transmitter and a receiver) for network device 300 to communicate with other devices and/or systems. For example, via network interface 310, network device 300 may communicate over a network, such as the Internet, an intranet, a terrestrial wireless network (e.g., a WLAN, WiFi, WiMax, etc.), a satellite-based network, optical network, etc. Network interface 310 may include a modem, an Ethernet interface to a LAN, and/or an interface/connection for connecting device 300 to other devices (e.g., a Bluetooth interface).

Communication path 312 may provide an interface (e.g., a bus) through which components of device 200 can communicate with one another.

Network device 300 may perform the operations described herein in response to processor 302 executing software instructions stored in a non-transient computer-readable medium, such as memory/storage 304. The software instructions may be read into memory/storage 304 from another computer-readable medium or from another device via network interface 310. The software instructions stored in memory/storage 304, when executed by processor 302, may cause processor 302 to perform processes that are described herein.

For example, when network device 300 is implemented as user device 202, user device 202 may collect network data and provide the data to provider network 204. In another example, when network device 300 is implemented as a processing device for performing clustering, in a centralized APP-SON architecture, network device 300 may determine, for each cell, a label that is associated with a particular cluster (a group to which the cell belongs based on data related to the cell).

Figure 4:
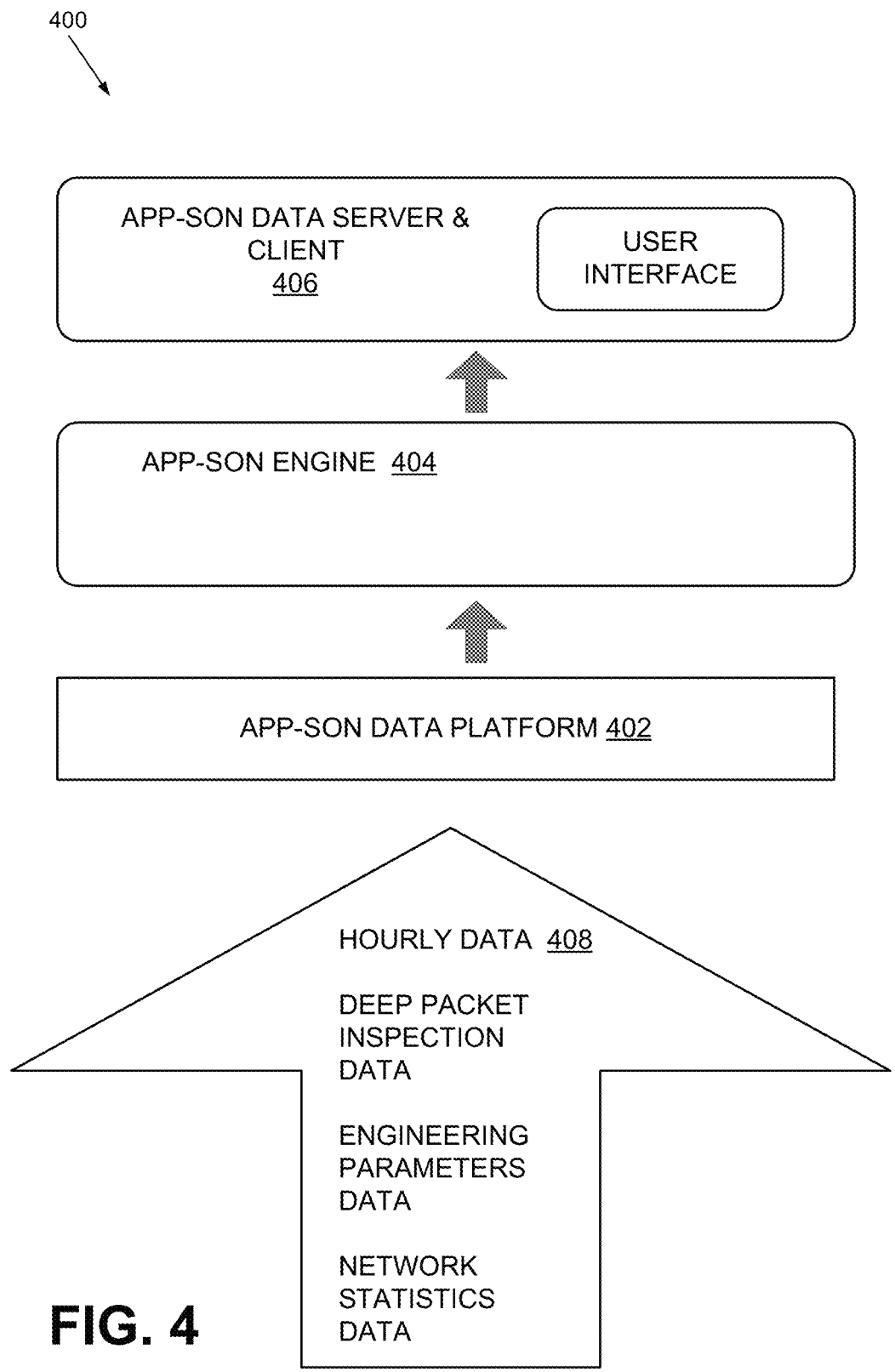
FIG. 4 depicts exemplary components of an exemplary APP-SON system implemented in the network environment of FIG. 2.

FIG. 4 illustrates exemplary components of an APP-SON 400 implemented in network environment 200. As shown, APP-SON 400 may include an APP-SON data platform 402, an APP-SON engine 404, and an APP-SON data server and client 406. Depending on the implementation, APP-SON 400 may include additional, fewer, different, or differently arranged components than those illustrated in FIG. 4.

APP-SON Data platform 402 may collect data, determine key performance indicators (KPI), and engineering parameters and provide them to APP-SON engine 404 and APP-SON data server and client 406. Examples of collected data include flow data (e.g., source destination information), type of packets (e.g., instant messaging, social media, video, music, game, anima, email, VoIP data, multimedia messaging), a cell ID, a geographical region associated with the cell, number of users, date, time, etc. Examples of key performance indicators include connection rate, dropped call rate, HTTP latency, etc.), download request success rate, instant messaging request success rate, TCP establishment latency, etc. Examples of engineering parameters include an antenna tilt angle, a beam width, a packet size, signal power, frequency, etc. In some implementations, the data may be collected from base stations (e.g., eNodeB 210, user devices 202, network devices (e.g., routers, DNS servers, DHCP servers, etc.), switching nodes, applications (e.g. browsers, instant messaging applications, VoIP applications, etc.), servers (e.g., web servers, database servers, etc.). server devices, etc. In some implementations, APP-SON data platform 402 may employ big data (e.g., high velocity, volume, and variety data) handling architectural components for handling the collected. For example, in one implementation, APP-SON data platform 402 may include a Hadoop system (e.g., MapReduce task tracker, and a Hadoop distributed file system), with JavaScript Object Notation (JSON) interface for NoSQL.

APP-SON engine 404 may receive data from APP-SON data platform 402, group the data (e.g., by time of day), categorize the received data into appropriate clusters, determine the best number of clusters, re-cluster the received data under specific criteria, perform regression analysis, and tune engineering parameters (e.g., re-calculate the optimum values of the parameters or make adjustments to the parameter values). APP-SON engine 404 may send the tuned engineering parameters to associated network devices 300 (e.g., to change device characteristics that correspond to the engineering parameters). APP-SON engine 404 may provide the parameters to APP-SON data server and client 406, so that system administrators, operators, and users can access the parameters.

APP-SON data server and client 406 may receive and store data collected at APP-SON data platform 402 and results from APP-SON engine 404 (e.g., the optimum number of clusters into which data should be grouped, tuned parameters, etc.). After storing the information, APP-SON data server and client 406 may allow network operator to access the data through, for example, a web interface, an application server interface, database access, etc. Through APP-SON data server and client 406, an operator may visualize data in APP-SON 400.

In addition to allowing users to access data, APP-SON data server and client 406 may send data to different network nodes, such that engineering parameters that have been tuned or adjusted can be used to drive particular equipment. For example, APP-SON data server 406 may determine a tuned parameter, such as an antenna tilt angle or a desired antenna transmission power, and transmit the data to a base station. APP-SON client 406 at the base station may then use the values to modify its mechanical antenna tilt angle, modify its transmission power, etc.

As further illustrated in FIG. 4, APP-SON data platform 402 may collect data at hourly specific intervals (e.g., second, minutes, hours, days, etc.) to reflect specific data granularity for tracking network traffic patterns. Data 408 may include, for example, deep packet inspection data, engineering parameters data, and network statistics data. These different data types are further described below.

Figure 5:
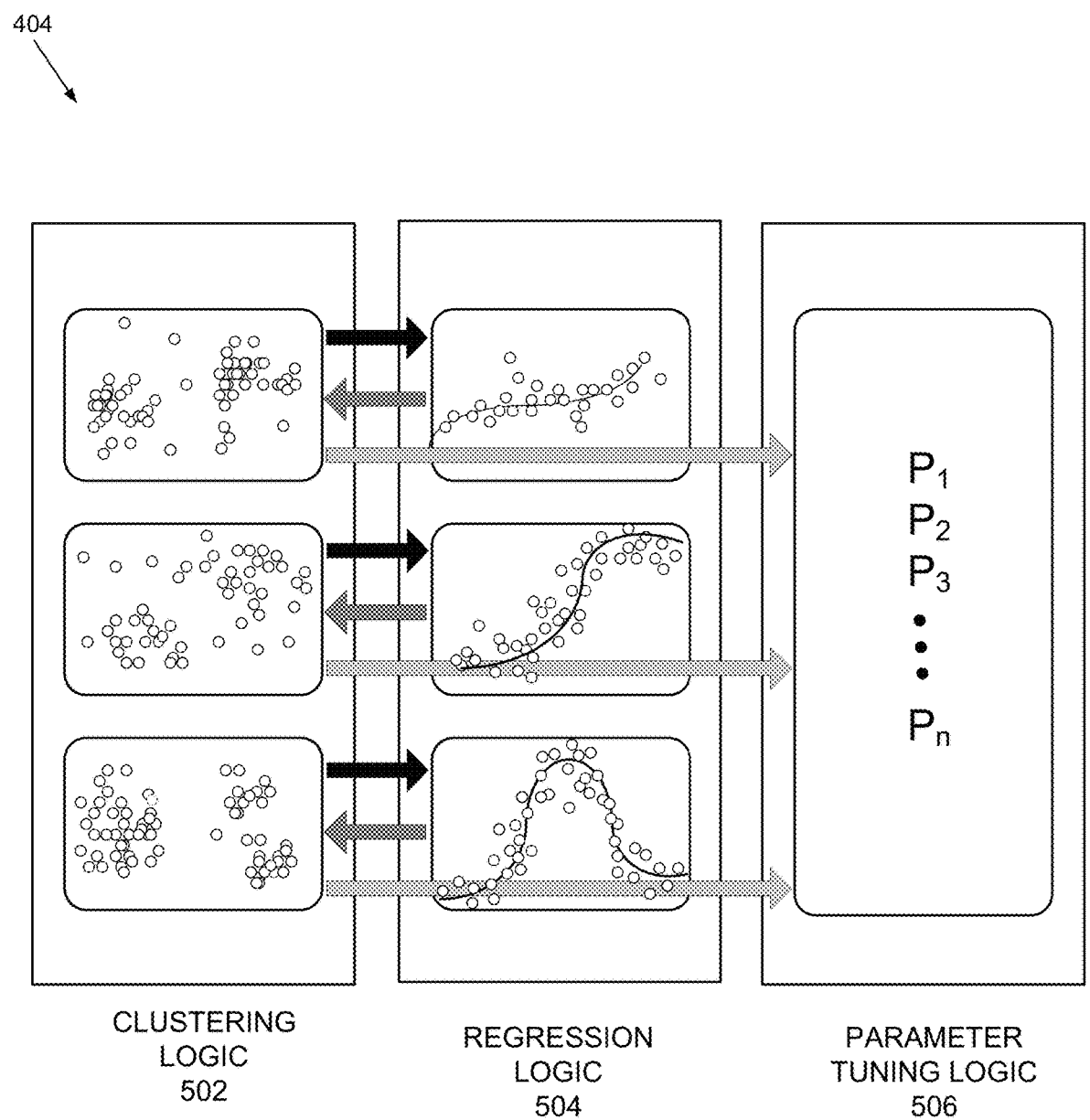
FIG. 5 illustrates exemplary components of the APP-SON engine of FIG. 4.

FIG. 5 illustrates some of exemplary components of APP-SON engine 404. As shown, APP-SON engine 404 may include clustering logic 502, regression logic 504, and parameter tuning logic 506. APP-SON engine 404 may include other components, as further described below.

Clustering logic 502 may receive, from APP-SON data platform 402, data that is partitioned into a number of groups (e.g., hourly groups), and perform clustering on the grouped data. Clustering is the task of aggregating a set of objects (e.g., cells) in such a way that objects in the same cluster are more similar to each other than those in other clusters. Depending on the implementation, clustering logic 502 may use different clustering techniques or a combination of techniques (e.g., K-Means, Fuzzy C-means, Gaussian Mixed Model, Hierarchical Clustering, Clustering LARge Applications (CLARA), etc.).

Regression logic 504 may receive clustering information from clustering logic 502, may perform regression analysis on the clusters, and may determine the optimum number of clusters. More details of regression is provided below with reference to FIG. 6 (block 620). After a regression analysis, APP-SON engine 404 (e.g., clustering logic 502) may re-cluster the data into the optimum number of clusters. As further described with reference to FIG. 6, the re-clustering may result in determining the best number of cell clusters, as well as correlate the cell traffic and application profile target KPIs to be optimized.

Parameter tuning logic 506 may determine optimum engineering parameter values. For example, parameter tuning logic 506 may determine by how much an antenna at a particular base station may be tilted (i.e., modify its mechanical tilt angle) by calculating the optimum values. After determining the optimal engineering parameter values, parameter tuning logic 506 may provide the values to client 406, which may be located at different nodes in network 204. APP-SON client 406 may use the received tuned or adjusted parameter values to drive its equipment/devices (e.g., set the operating point of a device to the received value).

Figure 6:
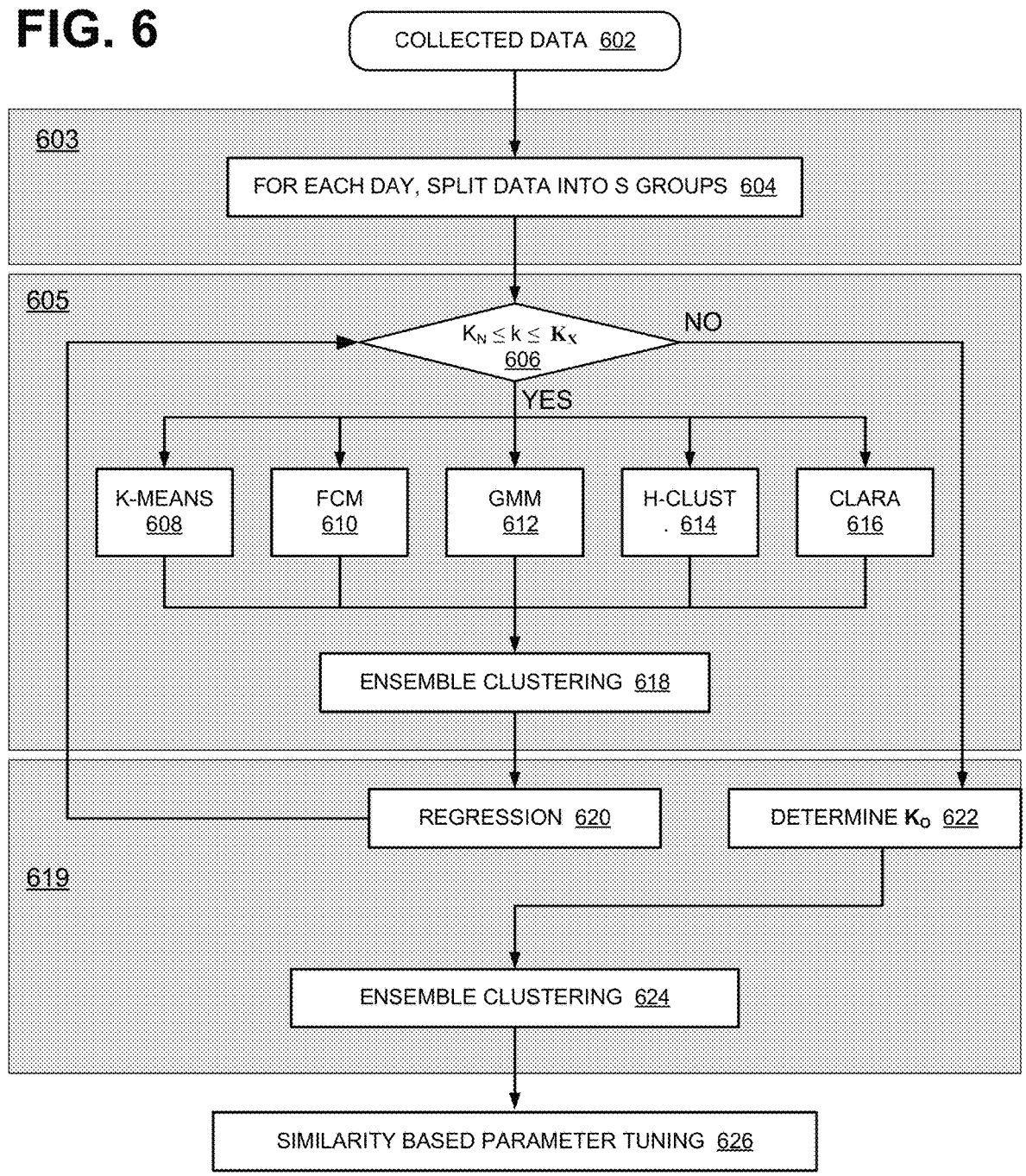
FIG. 6 is a flow diagram of an exemplary process that the APP-SON system of FIG. 4 may perform.

FIG. 6 is a flow diagram of an exemplary process 600 that APP-SON system 400 may perform. In FIG. 6, process 600 may be partitioned into sets 603, 605, and 619. Sets 603, 605, and 619 correspond to data grouping, clustering (see clustering logic 502), and regression (see regression logic 504), respectively. Block 626 corresponds to a process associated with parameter tuning logic 506.

As shown, process 600 may include obtaining data, such as key performance indicators, network statistics, and deep packet inspection (DPI) data (block 602). The collected data may then be classified into one of S groups (block 604). For example, data collected may be classified by the hour based on a time stamp at which data was collected. Therefore, if some data were collected between 11 A.M. and 12:00 PM, those data may be placed in 11 AM data group. If data is to be portioned on an hourly/daily basis, the collected data may be placed into one of 0-23 data bins. That is, S=24.

Process 600 may further include, for each of the S groups, testing whether the current numbers of cluster k, into one of which a cell is to be classified, is between the minimum clustering number ($K_N$) number and the maximum clustering number ($K_X$). In one implementation, $K_N$ is set to 3 and $K_X$ is set to 20. In other implementations, $K_N$ and $K_X$ may be set to different values. If the number of clusters (k) is between $K_N$ and $K_X$ (block 606: YES) process 600 may perform each of blocks K-Means 608, Fuzzy C-Means (FCM) 610, Gaussian Mixed Model (GMM) 612, Hierarchical Clustering (HCLUST) 614, and Clustering LARge Applications (CLARA) 616. The output of each clustering blocks 608-616 is a set of labels for cells for which data was collected. For each cell, different labels from the different clustering blocks 608-614 are then combined using ensemble clustering 618, which is described below with reference to FIGS. 9A, 9B and 10A-10D. After ensemble clustering 618, regression analysis is performed (block 620) using a deep neural network (DNN). The regression and DNN are further described below with reference to FIGS. 11A and 11B. Thereafter, process 600 returns to block 606, with an incremented value of k (e.g., k=k+1), to find the optimal value of K.

At block 606, if k is not is less than $K_N$ or greater than $K_X$, process 600 may proceed to block 622 to determine the optimum clustering number $K_O$ for the S group (block 622). $K_O$ is the clustering number k for which the accumulated data error is at the minimum.

Process 600 may further include applying ensemble clustering to the cells for the given S group (block 624). The ensemble clustering method at block 624 is the same method used at block 618, but applied to the different labels of the cells on different days. In some implementations, ensemble clustering, rather than being applied to different days, may be applied to the different labels on different, other time intervals (e.g., different weeks, months, M days, N-hours, etc.). Ensemble clustering 624 effectively relabels the clustered cells.

Once ensemble clustering 624 has been performed, engineering parameters of the network may be tuned (e.g., adjusted) based on similarity (block 626).

FIG. 7 describes exemplary logic in an embodiment of the flow diagram of FIG. 6, as a series of steps. In FIG. 7, lines 4-8 of description 700 correspond to clustering block 605 of FIG. 6. The output of each clustering blocks (i.e., the output of K-Means block 608, FCM block 610, GMM block 612, HCLUST block 614, and CLARA block 616) is a set of labels, wherein each label identifies a cluster to which each cell belongs. That is, each of the clustering methods outputs the result of classifying specified cells into k clusters.

As noted above, clustering is the task of grouping a set of objects in such a way that objects in the same cluster are more similar to each other than to those in other clusters. Accordingly, in APP-SON 400, each of the clustering methods reveals homogeneity of cell application characteristics (e.g., application data for each cell) that maybe used to identify the target network KPIs to best optimize user Quality of Experience.

FIG. 8 illustrates an exemplary table 800 of application characteristics. The data in table 800 may be used to cluster cells in the manner described herein. Table 800 is the result of collecting and measuring application data at specific time intervals (e.g., second, minutes, hours, etc.) on a specific day. As shown, table 800 include a column 801-1 identifying different traffic types (e.g., instant messaging traffic, reading traffic, social media traffic, navigation traffic, video traffic, etc.) Table 800 further includes additional columns, 801-2 to 801-N, that may show a percentage of network traffic for each application characteristic for different cells. For example, for cell 2, the video traffic is about 0.15 (or 15%), browsing and downloading is about 0.21 (21%), etc. Although table 800 shows 19 total application characteristics, in other implementations, table 800 may include additional or fewer application characteristics than those illustrated.

Returning to FIG. 7, since each of the multiple clustering methods may yield a different set of cluster labels, the labels from the clustering methods in lines 4-8 of description 700 need to be combined using an ensemble clustering (line 9 of description 700). None of the clustering methods in lines 4-8 is objectively perfect in all different circumstances, and hence ensemble clustering at line 9 of description 700 harnesses the power of multiple clustering algorithms.

In one implementation, the ensemble clustering method applies Hungarian Algorithm Assisted Clustering (HAAC). In HAAC, a relabeling function receives different labels for each cell from different clustering methods and derives a single label for each cell. At lines 20-22 of description 700, HAAC is used again, but rather than combining different labels from different clustering methods, HAAC is used to derive unique label for each cell under a different constraint. More specifically, since each cell may have different homogeneous application characteristics during the same hour in different days, the HAAC is applied over the different labels over the different days, to derive a single label.

FIGS. 9A and 9B show results of applying intermediate steps of HAAC to clusters. More specifically, FIG. 9A illustrates an exemplary results of clustering nine cells according to three different clustering methods (A, B, and C); and FIG. 9B illustrates an exemplary result of re-labeling the clusters of FIG. 9A in accordance with the HAAC method.

As shown in FIG. 9A, cells 1-9 are labeled under M-A (Labeling method A), M-B (Labeling method B), and M-C (labeling method C). After HAAC is applied, the labels in the M-B column in FIG. 9A are relabeled in the M-B column in FIG. 9B. Similarly, the labels in the M-C column in FIG. 9A are relabeled in the M-C column in FIG. 9B. Furthermore, in FIG. 9B, for each cell, a majority vote counting scheme is used to determine the combined label in the final vote column.

For example, in FIG. 9B, cell 1 has the label 1 for M-A, label 3 for M-B, and label 1 for M-C. Thus, the label 1 appears twice and label 3 appears once. The final label for cell 1 is, therefore, 1, by the majority of votes.

FIGS. 10A-10D illustrate the HAAC procedure in the step-by-step manner for cells 1-9 in FIG. 9A. To start, the labels in column M-A and M-B are "matched" or "connected." For example, the cell 1 in FIG. 9A is marked with the same label "1" in both the M-A and M-B columns. Thus, the label "1" is likely to be the same clustering label in the final M-A and M-B columns. In FIG. 10A, this is denoted by connecting label 1 in the left column to label 1 in the right column. Based on the similar approach, for cell 2, label 1 in the M-A column is connected to label 1 in the M-B column. Cell 3 is marked as label 1 in the M-A column and 2 in the M-B column. This is denoted, in FIG. 10A, by connecting the label 1 in the left column to label 2 in the right column.

After applying the preceding procedure to each of the cells in FIG. 9A, the connections between the labels in the M-A column and the labels in the M-B column are as shown in FIG. 10A. That is, FIG. 10A illustrates the relationship between labels generated by the method A and the method B. The links between the left side labels and the right side labels can be interpreted as "potential" relabeling paths. However, in FIG. 10A, each node at the left side is connected to multiple nodes at the other side. After fully applying HAAC, each node at the left side will be connected to only one node at the right side.

The next step in the HAAC is to select potential edges (i.e., connections) between the left side and right side labels. In FIG. 10B, the edge from the left-side label 1 to the right-side label 1 is selected. The selected potential edge is denoted L1->R1 and is depicted by a bolded connecting line. After the first selection, another selection is made, but for label 2. As further shown in FIG. 10B, the edge from left-side label 2 (L2) to right side label 2 (R2) is also selected. These selected edges represent the potential mapping for labels 1 and 2 (from nodes on the left side to nodes on the right side) and are considered "matched edges."

At this point, the label 3 on the left side needs to be matched to a label on the right side. However, a direct connection L3 to R1 or L3 to R2 cannot be selected as matched edges, because R1 and R2 are already paired with L1 and L2, respectively. Thus, rather than selecting a matched edge for label 3, an augmented path needs to be selected for L3. In HAAC, an augmented path is defined as a path that begins with an unmatched edge and alternately succeeded by a matched edge and unmatched edge. For L3, an augmented path can be created with existing edges as L3->R1->L1->R2->L2->R3. FIG. 10C illustrates the path as a series of bolded lines.

The next step in applying HAAC is to remove matched edges from the augmented path, and to add any additional matched edges. In the augmented path illustrated in FIG. 10C, edge R1->L1 (or L1->R1) and R2->L2 (or L2->R2) are matched edges, and they may be removed from the augmented path. The resulting edges are illustrated in FIG. 10D. Further, L4 cannot be linked with R3, because R3 is already occupied by L2. Hence, L4 can be matched with R4. FIG. 10D indicates that L1->R2, L2->R3, L3->R1, and L4->R4. Substituting the labels in the table of FIG. 9A in accordance with the mapping illustrated in FIG. 10D results to the table in FIG. 9B.

Referring back to FIG. 7, lines 10-17 of description 700 correspond to regression block 620 of FIG. 6. As used herein, the term "regression" refers to a statistical process for estimating the relationship among variables. In APPSON 400, the regression is applied to derive the relationship between engineering parameters and network performance indicators. Furthermore, the accuracy (or the error) of the regression is used to determine the best number of clusters into which cells may be categorized.

As further shown in lines 13-16 in description 700, a deep neural network (DNN) is used to determine accumulated accuracy $A_k$ for each result of clustering. The cluster count k, at which $A_k$ value is maximum is then selected as the optimum clustering number. In lines 13-16, X is the input vector, Y is the desired output (i.e., ground truth), $\hat{Y}$ is the actual output of the DNN, $SS_{E,h}$ is the sum of squares error, $SS_{T,h}$ is the sum of squares signal, $A_k$ is the weighted sum of accuracy, W is the weight (calculated as the percentage of samples in the h-th cluster), and R is the measure of accuracy. Mathematically, lines 11-17 and 19 can be summarized in the following mathematical formula:

$$A_{all} = \text{Max}\left(\sum_{h=1}^{k} A_{k,h} W_h, k \in [3, N]\right) \quad (1)$$

In (1), N is equivalent to $K_X$ in line 3 of description 700.

Figure 11A:
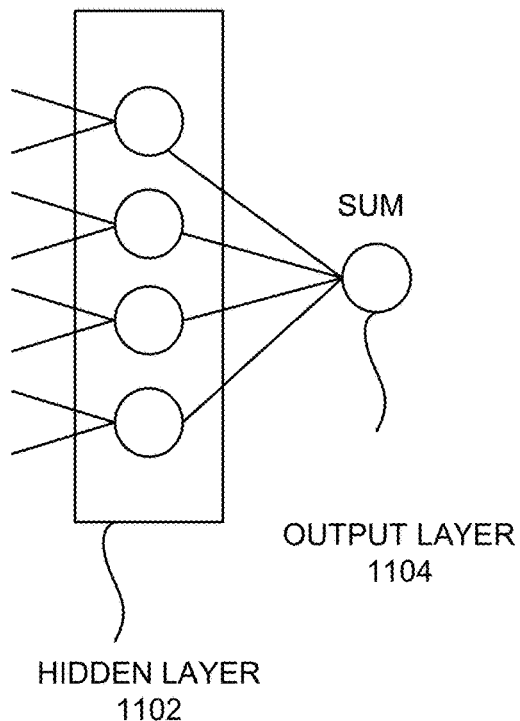
FIG. 11A illustrates the relationship between an output node and input nodes in a deep neural network.
Figure 11B:
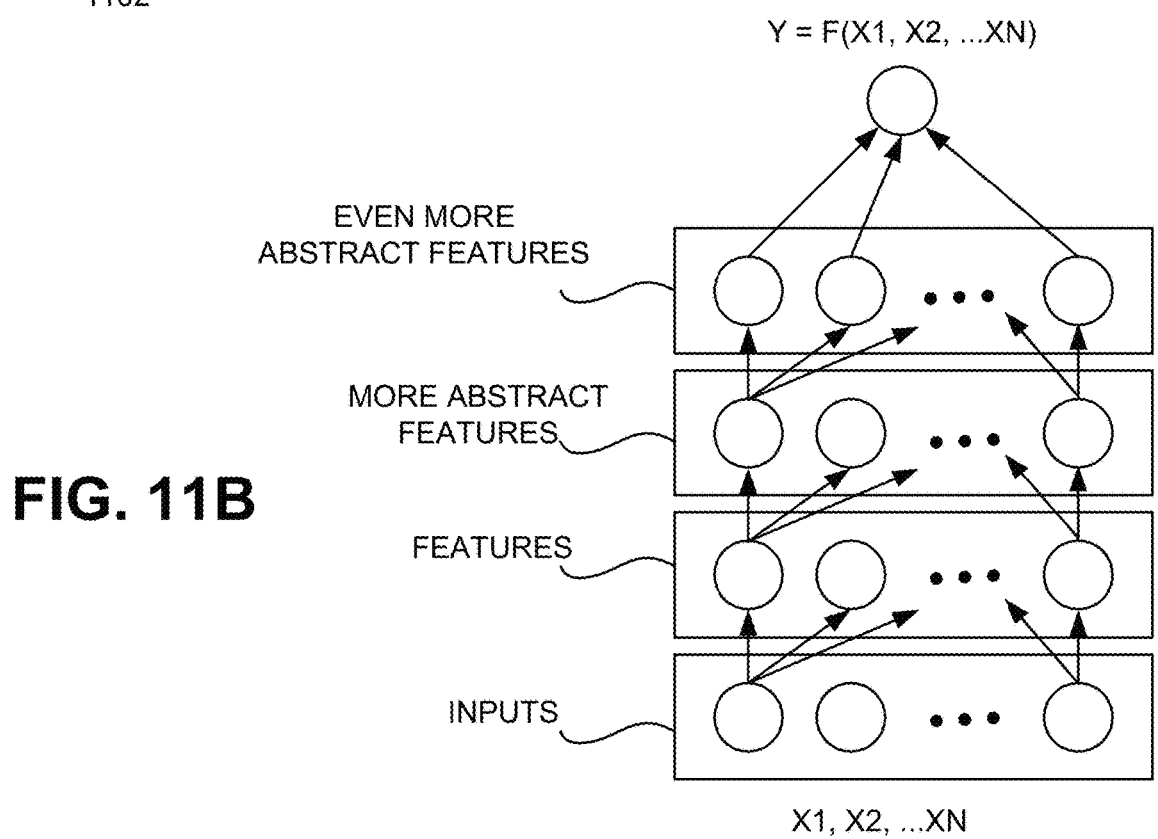
FIG. 11B illustrates an exemplary deep neural network.

In line 12 of description 700, the expression Y=f(X) indicates that a DNN is trained so that the DNN maps X (input vector) to $\hat{Y}$. FIG. 11A illustrates the relationship between an output node and input nodes of a portion of a DNN. As shown, Ŷ=X W+b, where the variable X represents the input vector to a hidden layer 1102. During the backpropagation training, the weight W and the bias b are adjusted until the difference between Ŷ and Y is minimized. FIG. 11B shows occurrences of the input-output neurons in FIG. 11A in a Deep Neural Network.

Figure 12:
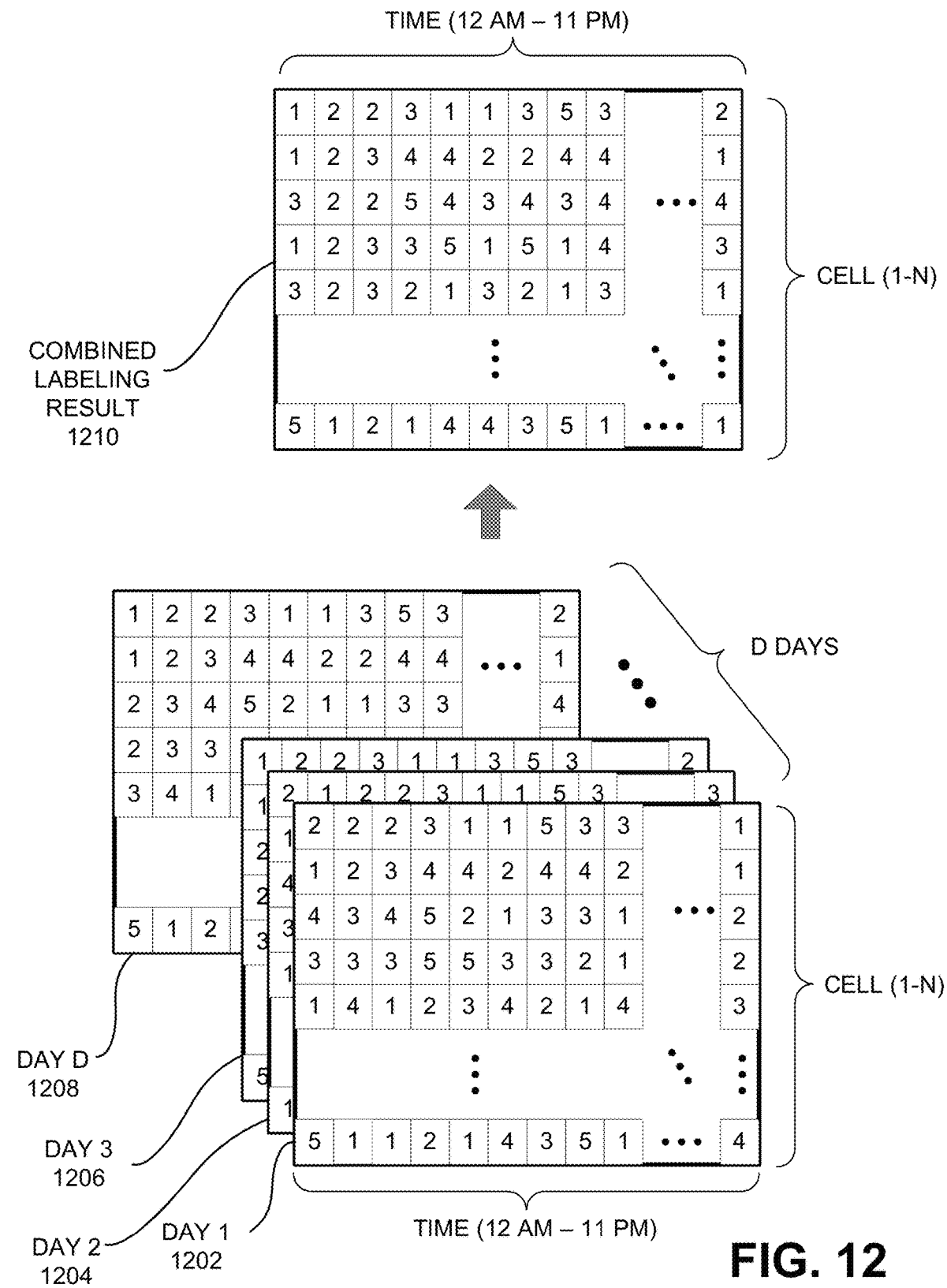
FIG. 12 illustrates an exemplary process for combining different labels associated with clusters across temporal space.

Returning to FIG. 7, lines 20-22 of description 700 correspond to ensemble clustering block 624 of FIG. 6. The ensemble clustering is performed to reduce the dimension in temporal space, to combine multiple clustering results across different days. FIG. 12 illustrates the process of combining different labels of clusters across temporal space.

As shown in FIG. 12, each of N cells is clustered (i.e., labeled), for different time intervals. For example, for a specific day, the clustering of the N cells is arranged in a table, such as table 1202 for day 1, table 1204 for day 2, table 1206 for day 3 . . . and table 1208 for day D. Therefore, given a cell (e.g., cell 2) at 11 AM, there are D different labels for D different days. To obtain the best label over the D days, HAAC is applied. The result of applying HAAC is illustrated as table 1210.

Returning to FIG. 7, lines 25-33 of description 700 correspond to parameter tuning block 626 of FIG. 6. and therefore. to determine the optimal values for the engineering parameters. As noted above, during the tuning, the engineering parameters are adjusted by a calculated amount (i.e., "tuned") to optimize network performance and improve user Quality of Experience in each cluster. During the engineering parameter tuning, target optimal values of the KPI's are set, and then APP-SON engine 400 looks for all cell candidates with the highest similarity of performance to the target cell (line 27 of FIG. 7). The similarity is evaluated based on the following expression:

$$Similarity_i = 1 - \sum_{n=1}^{r} \frac{|P_{i\text{-}n} - P_{c\text{-}n}|}{R_n}. \quad (2)$$

In expression (2), $P_{i\text{-}n}$ is the value of n-th engineering parameter for the i-th data record in the cluster. $P_{c\text{-}n}$ is the value of n-th engineering parameter for the current cell waiting to be tuned. $R_n$ is the value range of the n-th engineering parameter. At lines 28-33 of description 700, APP-SON engine 400 derives the values of engineering parameters based on data pertaining to such cell candidates.

After values of the parameters have been tuned (e.g., adjusted), the parameter values may be passed to APP-SON client 406. In one implementation, APP-SON client 406 may be installed at different network nodes, and may receive the tuned values from APP-SON engine 404 and then use the received parameter values to drive its equipment (e.g., set an operating point of a device to the parameter value).

FIG. 13 illustrates exemplary key performance indicators and data collected and used for APP-SON 400. As shown, table 1300 lists different types of data/parameters and specific data. Although not shown, the collected data may also include different types of network traffic, as illustrated in table 800 of FIG. 8.

Figure 14:
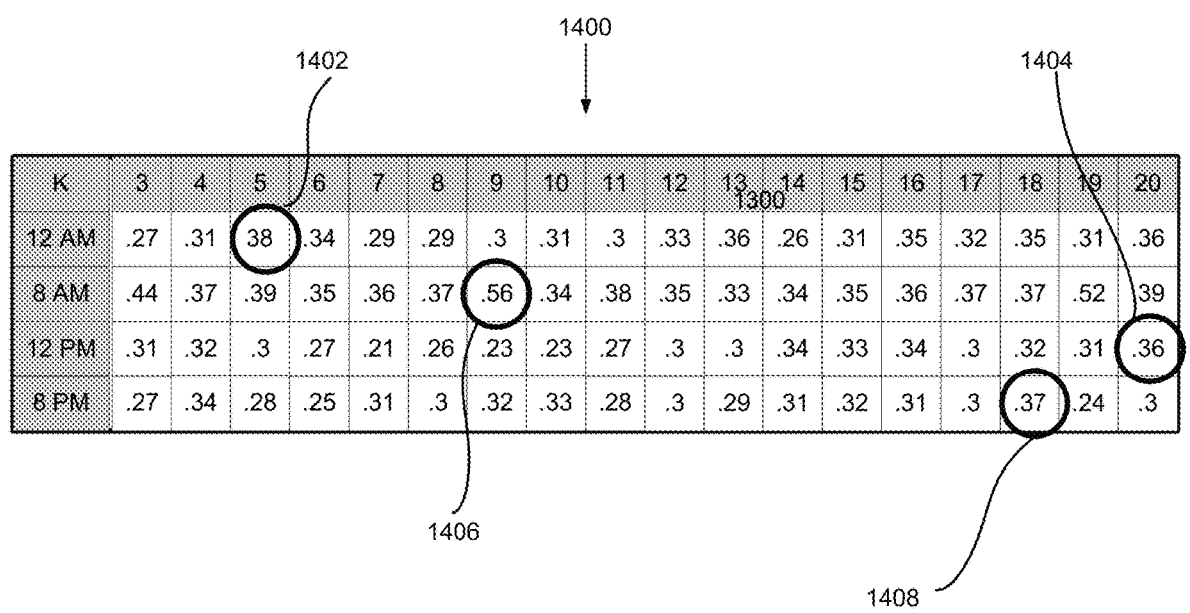
FIG. 14 illustrates a result of applying an exemplary process for determining the best number of Long-term Evolution (LTE) cell clusters at different hours.

FIG. 14 illustrates results of applying the process for determining the best number of clusters within the flow diagram of FIG. 6 (block 622) and the logic of FIG. 7 (lines 10-17 in description 700). More specifically, table 1400 illustrates, at different times (e.g. 12 AM, 8 AM, 12 PM and 8 PM), the values of $A_k$ for different number k of clusters. In table 1400, k ranges from 3 to 20. For 12 AM, $A_k$ is at the maximum value of 0.38 when k is 5 (circle 1402); for 8 AM, $A_k$ is at the maximum value of 0.56 when k is 9 (circle 1404); for 12 PM, $A_k$ is at the maximum value of 0.36 when k is 20 (circle 1406); and for 8 PM, $A_k$ is at the maximum value of 0.37 when k is 18 (circle 1408).

Figure 15:
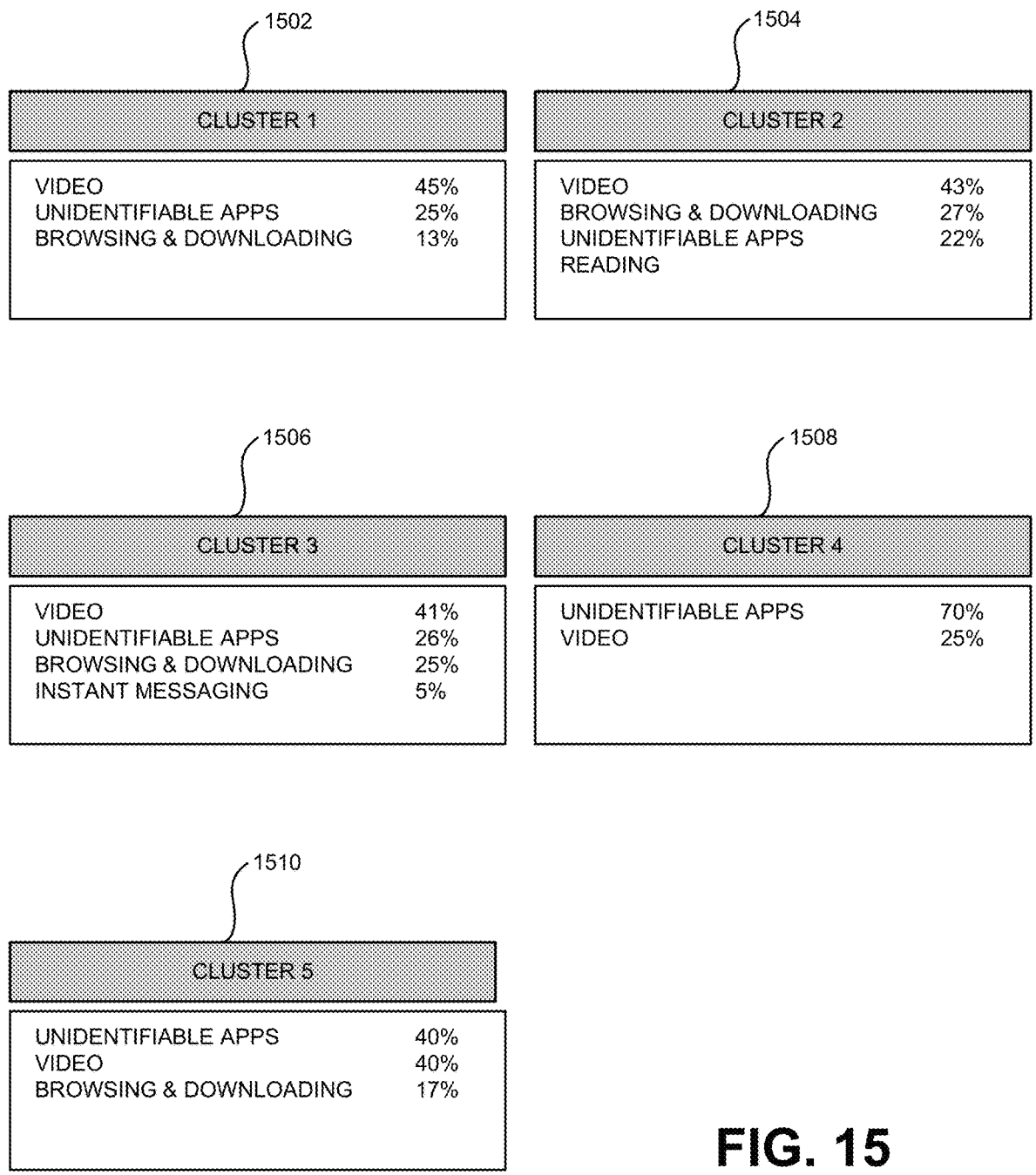
FIG. 15 illustrates exemplary clusters that are obtained as the result of clustering and identifying the best number of clusters according to FIGS. 6 and 7.

FIG. 15 illustrates exemplary clusters that are obtained as the result of identifying clusters and the best number of clusters according to FIGS. 6 and 7. In FIG. 15, there are five clusters 1502, 1504, 1506, 1508, and 1510. Each cluster is characterized by specific amounts of different types of traffic. For example, for cluster 1502, video traffic is 45%, unidentified application traffic is 25%, and browsing and downloading traffic is 13%.

Figure 16A:
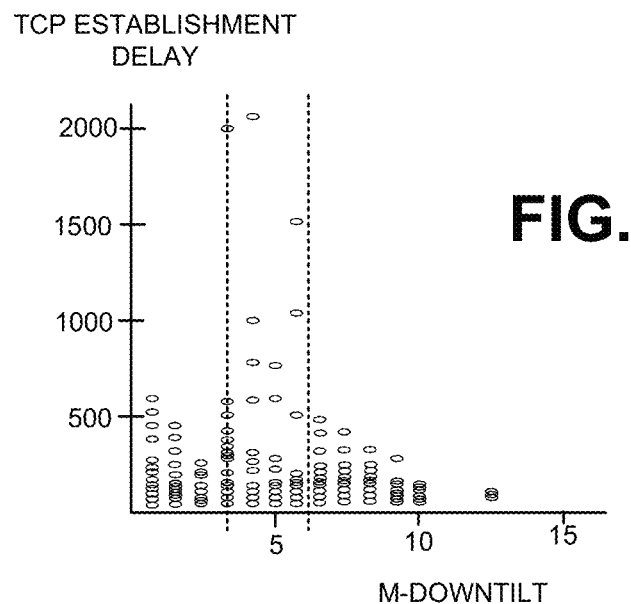
FIGS. 16A and 16B illustrate scatter plots of Transmission Control Protocol (TCP)-Internet Protocol (IP) establishment delay times as functions of mechanical tilt angles and electrical tilt angles of an antenna at an exemplary cell.
Figure 16B:
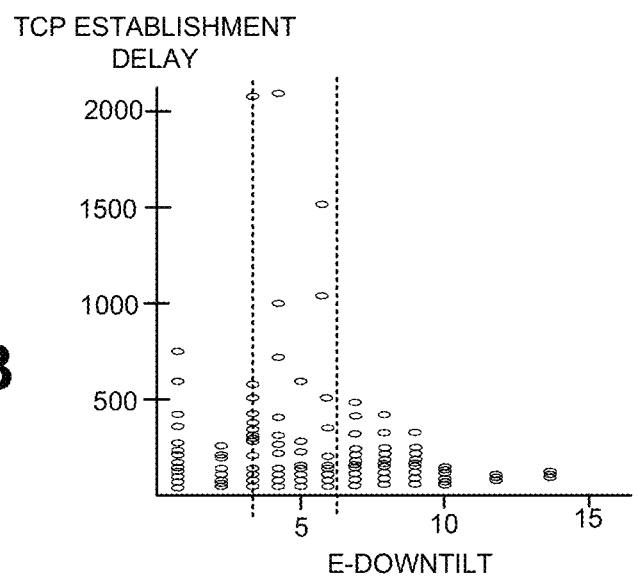

FIGS. 16A and 16B illustrate scatter plots of a Transmission Control Protocol (TCP)-Internet Protocol (IP) establishment delay times as functions of mechanical tilt angles and electrical tilt angles of an exemplary antenna. For scatter plots whose points are irregularly scattered, there would be no parameter to tune. In FIG. 12, however, there are data points with high TCP establishment latency, in a specific range of engineering parameters (i.e., tilt angles). For example, data points with TCP Establishment latency value higher than 1000 are only present in the range between 3 and 7 for mechanical down tilt angles and 3 to 6 for electrical down tilt angles. Tuning mechanical tilt angles and electrical tilt angles via APP-SON 400 thus result in decreases in TCP Establishment delays. The tuned values may then be used, at each base station, to set actual antenna title angles.

Figure 17:
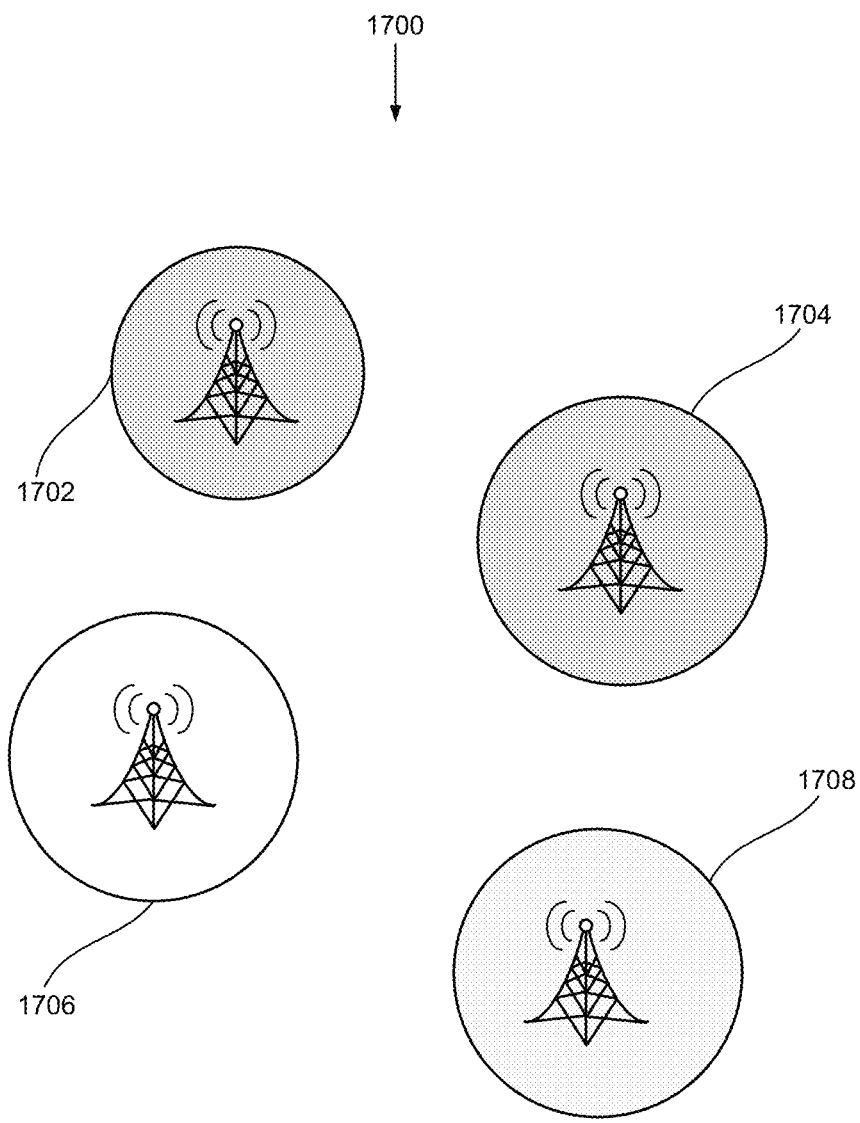
FIG. 17 depicts cells identified on a user interface for the APP-SON system of FIG. 4.

FIG. 17 depicts cells identified on a user interface for the APP-SON 400. The cells are labeled 1702 through 1708. In an embodiment, cells could be shown with different colors or other indicia. Cells with the same indicia could belong to the same cluster. For each cluster, a corresponding parameter tuning policy may be defined and enforced to automate self-optimization. The network performance and user quality of experience can be timely tuned and used at different network nodes under the policy.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIG. 6 and the accompanying description 700 provided in FIG. 7, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising:
   one or more devices configured to:
   collect, from nodes of a wireless network, data pertaining to a plurality of cells of the wireless network, wherein the data include at least traffic information for each of the plurality of cells;
   divide the collected data into a plurality of groups based on timestamps associated with the collected data, wherein each of the timestamps indicates a time at which the corresponding datum was collected, and wherein each of the groups is associated with a different interval of time;
   perform, for each of the groups:
   for each integer in a range having a low limit and a high limit, wherein the low limit is greater than one and the high limit is greater than the low limit:
   cluster the cells into a number of clusters, wherein the number is equal to the integer; and
   train a deep neural network to perform a regression analysis on the number of clusters;
   select one of the integers as an optimum number of clusters based on the regression analyses;
   re-cluster the cells into the optimum number of clusters; and
   modify engineering parameters based on the re-clustering to optimize performance of the wireless network and quality of experience pertaining to the wireless network; and
   send a first modified parameter, among the modified parameters, to a network device included in the wireless network, wherein the network device is configured to:
   receive the first modified parameter; and
   set the received parameter as an operating point of a component of the wireless network.

2. The system of claim 1, wherein when the one or more devices cluster the cells, the one or more devices apply multiple clustering methods, wherein the multiple clustering methods include at least one of:
   K-Means clustering, Fuzzy C-Means clustering, Gaussian Mixed Model, Hierarchical clustering; and Clustering Large Application clustering.

3. The system of claim 1, wherein when the one or more devices cluster the cells, the one or more devices are further to:
   apply the Hungarian Assisted Algorithm Clustering (HAAC).

4. The system of claim 1, wherein when the one or more devices perform the regression analysis, the one or more devices are to:
   determine a difference between an output of the deep neural network and a target value; and
   calculate an accuracy value based on the determined difference.

5. The system of claim 4, wherein when the one or more devices select one of the integers as the optimum number of clusters, the one or more devices are further to:
   determine a value of the integer, between the low limit and the high limit, at which the accuracy value is a maximum.

6. A method comprising:
   collecting, from nodes of a wireless network, data pertaining to a plurality of cells of the wireless network, wherein the data include at least traffic information for each of the cells;
   dividing the collected data into a plurality of groups based on timestamps associated with the collected data, wherein each of the timestamps indicates a time at which the corresponding datum was collected, and wherein each of the groups is associated with a different interval of time;
   performing, for each of the groups:
   for each integer in a range having a low limit and a high limit, wherein the low limit is greater than one and the high limit is greater than the low limit:
   clustering the cells into a number of clusters, wherein the number is equal to the integer; and
   training a deep neural network to perform a regression analysis on the number of clusters;
   selecting one of the integers as an optimum number of clusters based on the regression analyses;
   re-clustering the cells into the optimum number of clusters; and
   modifying engineering parameters based on the re-clustering to optimize performance of the wireless network and quality of experience pertaining to the wireless network; and
   sending a first modified parameter, among the modified parameters, to a network device included in the wireless network, wherein the network device is configured to:
   receive the first modified parameter; and
   set the received parameter as an operating point of a component of the wireless network.

7. The method of claim 6, wherein the data further include one or more of:
   network statistics; key performance indicators; or engineering parameters.

8. The method of claim 7, wherein the network statistics include a number indicating an amount of network traffic of a particular type, wherein the key performance indicators include a Transmission Control Protocol (TCP)-Internet Protocol (IP) session establishment delay, and wherein the engineering parameters include a mechanical or electrical down tilt of an antenna.

9. The method of claim 6, wherein dividing the collected data into the plurality of groups includes:
dividing the collected data into hourly groups.

10. The method of claim 6, wherein clustering the cells into the number of clusters includes applying multiple clustering methods, wherein the multiple clustering methods include at least one of:
K-Means clustering, Fuzzy C-Means clustering, Gaussian Mixed Model, Hierarchical clustering; and Clustering Large Application clustering.

11. The method of claim 6, wherein clustering the cells comprises:
applying the Hungarian Assisted Algorithm Clustering (HAAC).

12. The method of claim 6, wherein the regression analysis includes:
determining a difference between an output of the deep neural network and a target value; and
calculating an accuracy value based on the determined difference.

13. The method of claim 12, wherein selecting one of the integers as the optimum number of clusters includes:
determining a value of the integer, between the low limit and the high limit, at which the accuracy value is a maximum.

14. The method of claim 6, wherein re-clustering the cells includes:
applying the Hungarian Assisted Algorithm Clustering (HAAC) to different labels pertaining to different intervals at which the data are collected.

15. The method of claim 6, wherein modifying the engineering parameters includes:
determining values, of the engineering parameters, that are closest to target values, wherein the target values are associated with key performance indicators.

16. Non-transitory computer-readable media comprising computer-executable instructions, when executed by one or more processors, cause the one or more processors to:
collect, from nodes of a wireless network, data pertaining to a plurality of cells of the wireless network, wherein the data include at least traffic information for each of the cells;
divide the collected data into a plurality of groups based on timestamps associated with the collected data, wherein each of the timestamps indicates a time at which the corresponding datum was collected, and wherein each of the groups is associated with a different interval of time;
perform, for each of the groups:
for each integer in a range having a low limit and a high limit, wherein the low limit is greater than one and the high limit is greater than the low limit:
cluster the cells into a number of clusters, wherein the number is equal to the integer; and
train a deep neural network to perform a regression analysis on the third number of clusters;
select one of the integers as an optimum number of clusters based on the regression analyses;
re-cluster the cells into the optimum number of clusters; and
modify engineering parameters based on the re-clustering to optimize performance of the wireless network and quality of experience pertaining to the wireless network; and
send a first modified parameter, among the modified parameters, to a network device included in the wireless network, wherein the network device is configured to:
receive the first modified parameter; and
set the received parameter as an operating point of a component of the wireless network.

17. The non-transitory computer-readable media of claim 16, wherein the data further include one or more of:
network statistics; key performance indicators; or engineering parameters.

18. The non-transitory computer-readable media of claim 17, wherein the network statistics include a number indicating an amount of network traffic of a particular type, wherein the key performance indicators include a Transmission Control Protocol (TCP)-Internet Protocol (IP) session establishment delay, and wherein the engineering parameters include a mechanical or electrical down tilt of an antenna.

19. The non-transitory computer-readable media of claim 16, wherein when the one or more processors divide the collected data into the plurality of groups, the one or more processors are configured to:
divide the collected data into hourly groups.

20. The non-transitory computer-readable media of claim 16, wherein when the one or more processors cluster the cells into the number of clusters, the one or more processors apply multiple clustering methods, wherein the multiple clustering methods include at least one of:
K-Means clustering, Fuzzy C-Means clustering, Gaussian Mixed Model, Hierarchical clustering; and Clustering Large Application clustering.

* * * * *